United States Patent

[11] 3,596,439

| [72] | Inventor | Edward L. Moragne<br>4723 Nenana, Houston, Tex. 77035 |
|---|---|---|
| [21] | Appl. No. | 838,465 |
| [22] | Filed | July 2, 1969 |
| [45] | Patented | Aug. 3, 1971<br>Continuation-in-part of application Ser. No. 713,205, Mar. 14, 1968, now Patent No. 3,494,108. |

[54] AIR CLEANER
19 Claims, 4 Drawing Figs.

[52] U.S. Cl. .................................................. 55/233,
55/242, 55/260, 98/115, 261/96
[51] Int. Cl. ............................................. B01d 47/00
[50] Field of Search ........................................... 55/233,
260, 242, 315, 350; 261/94—99; 98/115 K

[56] References Cited
UNITED STATES PATENTS

| 2,094,343 | 9/1937 | Bichowsky | 261/98 |
| 2,160,549 | 5/1939 | Kurth | 261/98 |
| 2,878,107 | 3/1959 | Ruth | 55/233 |
| 3,242,652 | 3/1966 | Malenchini | 55/242 |
| 3,364,660 | 1/1968 | Rebours | 261/119 |
| 3,494,108 | 2/1970 | Moragne | 55/233 |

Primary Examiner—Frank W. Lutter
Assistant Examiner—Bernard Nozick
Attorney—Carlos A. Torres ABSTRACT: A partially enclosed structure having an inclined wall which is provided with a plurality of ports for admitting grease-laden vapors. Baffles extend internally from each of the ports and are employed to direct the incoming vapors through filter material disposed within the structure. A spray header is disposed above the filter material and a submersible pump in the lower portion or reservoir of the structure forces cleaning solvent through the header where it is sprayed on the filter material to cleanse it of grease and oil. The baffles prevent the cleaning solution from flowing out of the ports in the inclined wall and all of the solution is returned to the reservoir and recirculated. A water supply line and float valve are employed to maintain a predetermined liquid level in the reservoir. The inclined, ported surface of the structure is designed to fit closely adjacent a cooking surface to effectively gather grease-laden vapors and the reservoir is designed to fit in the spacing between the stove and kitchen wall.

In a modification, the structure is made in two adjoining sections to facilitate construction and servicing.

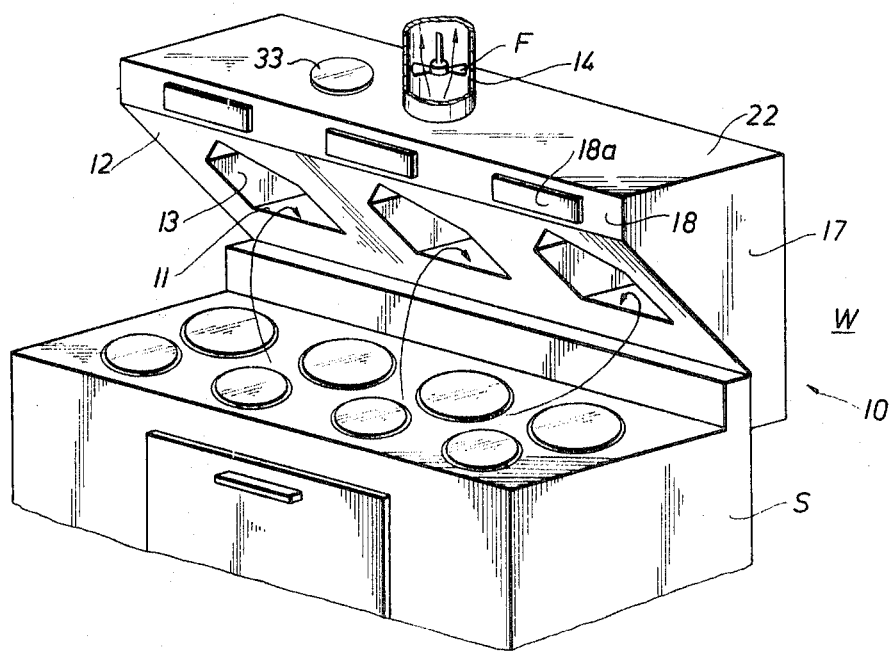
FIG. 1
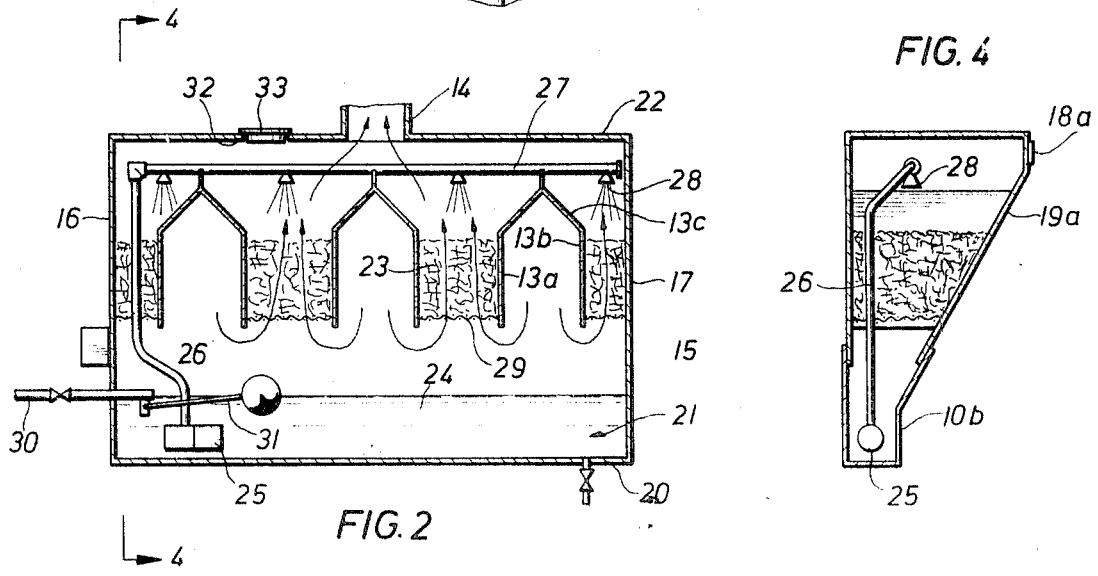
FIG. 2
FIG. 4
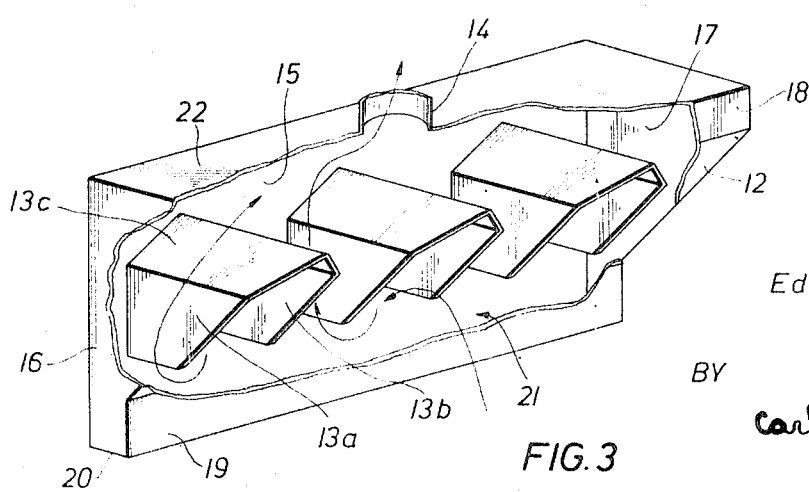
FIG. 3
Edward L. Moragne
INVENTOR
BY
Carlos A. Torres
ATTORNEY

AIR CLEANER

CROSS-REFERENCE TO RELATED APPLICATION

The present application is a continuation-in-part of U.S. Pat. application, Ser. No. 713,205 filed Mar. 14, 1968 now U.S. Pat. 3,494,108, entitled "Air Cleaner" and invented by the applicant herein.

BACKGROUND OF THE INVENTION

1. Field of the Invention

The present invention relates generally to the field of air filtration. In particular, the present invention relates to a new and improved air cleaner for removing grease and oil from vapors emanating from cooking foods to reduce the fire hazard presented by such vapors.

2. Brief Description of the Prior Art

To the extent that they are known to the applicant, all of the prior art devices and systems which have been used to prevent the accumulation of impurities in vapor exhaust systems are relatively complex and expensive. Many of these systems employ a refrigerating means for cooling the vapors to effect a condensation of grease and other airborne impurities on various cooled surfaces. Often, the condensed impurities are thereafter removed from the cooled surface by heating the surface to melt the impurities or by spinning the surface to remove the impurities under the influence of centrifugal force.

One prior art system filters the grease-laden vapors through a pad of porous filter material. After a predetermined exposure time, the filter pad is automatically removed and immersed in a washing solution to remove the accumulated grease. The removed filter is replaced by a filter which has been washed in the washing solution and the cycle is repeated continually. The means required to automatically effect the exchange of filters in this prior art system is both complex and expensive.

Another prior art system, such as that disclosed in U.S. Pat. No. 2,601,519, draws grease-laden vapors through the blades of a centrifugal fan. The fan blades are cooled and cleansed by a spray of washing solution and the impurities in the vapors condense as they strike the cooled fan blades. The centrifugal force created by the spinning of the fan blades cooperates with the cleansing solution to throw the condensed impurities against a surrounding filter pad. The washing solution is sprayed over the filter pad to break down the impurities and the runoff from the filter pad is accumulated in a reservoir where it is thereafter recirculated through the system by a pump. Since unfiltered vapors strike the fan, the fan blades may accumulate unbalanced deposits of grease which cannot be removed by the combined action of the centrifugal force and the washing spray. Without periodic manual cleaning, the resulting buildup of grease at one part of the fan may create an unbalanced condition which would produce destructive oscillations and noise.

The prior art system taught by U.S. Pat. No. 3,260,189 employs a filter-wetting technique in combination with both a refrigeration means and an electrostatic filter to cleanse recycled air. One major problem area associated with the system taught by this patent is that a dry prefilter is employed in the first filtering step. The prefilter must be manually replaced at relatively short time intervals or the accumulation of grease and oil creates a fire hazard. The same danger exists in any of the prior art systems which employ an initial dry filter.

It is also desirable to employ a self-contained structure for cleaning cooking vapors since the auxiliary equipment necessary in many prior art systems is complex and often occupies required kitchen space. Moreover, current regulator agencies require that kitchen air treating systems conform to certain performance standards relating to air flow over the stove surface and to reliability of automatic treating equipment. Many of the prior art systems fail to conform to these regulations in that they improperly draw air over the cooking surface of the stove and as a result, the grease-laden vapors are not properly ducted into the air cleaner. With respect to reliability standards, it is apparent that any air-treating system tends to become less reliable as the number of its components and automatic controls are increased.

The foregoing problems as well as others in the prior art systems have tended to require high maintenance costs, and have reduced the reliability of the systems as an effective safety measure.

SUMMARY OF THE INVENTION

The present invention discloses a self-contained, air-cleaning system which is adapted to be mounted directly over a stove or other cooking surface. The front wall of the cleaner is inclined over the cooking surface and grease-laden vapors emanating from cooking foods are drawn directly into ports formed in the front wall. The angular disposition of the front wall and the proximity of the inlet ports to the cooking surface cooperate to draw air over the cooking surface to ensure maximum vapor filtration.

Vapors drawn into the cleaner are forced around baffles through filter material which remove their grease and oil content. A submersible electrically driven pump disposed in the lower portion or reservoir of the cleaner forces a cleaning solvent through a spray header mounted above the filter material. Nozzles on the header spray the cleaning solvent on the filter material to cleanse it of the grease and oils removed from the cooking vapors. As the solvent flows downwardly through the filter material, the baffles prevent any fluid from escaping through the inlet ports and all of the solvent is returned to the reservoir to be recirculated.

The reservoir is designed to be disposed in the standard spacing required between a kitchen wall and stove to permit the cleaner to be employed in confined areas. A water supply line is provided into the reservoir and a float valve regulator is employed to automatically maintain a predetermined liquid level in the reservoir. The top of the cleaner is easily accessible and may serve as storage space for kitchen supplies. From the foregoing, it may be appreciated that the air cleaner of the present invention provides a dependable means for efficiently removing grease and other impurities from kitchen vapors. Moreover, the cleaner is self-contained and may be simply and economically produced.

Other features and advantages of the present invention will become apparent from the following description and the related drawings and claims.

BRIEF DESCRIPTION OF THE DRAWINGS

FIG. 1 is a perspective front view of the air cleaner of the present invention mounted over a conventional stove;

FIG. 2 is a perspective view of the cleaner of the present invention with portions of the outer covering being removed for purposes of illustration;

FIG. 3 is a front view of the cleaner of the present invention with the front facing removed; and FIG. 4 is a sectional view corresponding substantially to the view seen along line 4—4 of FIG. 3 and illustrating a preferred modification of the present invention.

DESCRIPTION OF THE PREFERRED EMBODIMENTS

FIG. 1 illustrates the improved air cleaner 10 of the present invention in position over a stove S with its lower reservoir portion disposed between the wall W and the back of the stove in the spacing normally required by fire control regulations. The main body of the cleaner 10 slopes from the rear of the stove S and over the cooking surface to receive grease-laden vapors emanating from cooking foods. A fan F or other appropriate means is employed to draw air over the cooking surface of the stove S and into the cleaner 10 through inlet ports 11 formed in an inclined wall 12 extending across the front of the cleaner. The air entering the openings 11 is deflected by a baffle structure 13 through filtering means and exhausted from the cleaner 10 through a suitable outlet conduit 14 which is vented externally of the stove area. As will hereinafter be described in greater detail, a cleaning solvent is continuously circulated over the filter means contained in the cleaner 10 to remove grease and oil accumulated by the filter and to assist in cooling the cleaner structure.

As best illustrated in FIGS. 2 and 3, the internal baffles 13 employed to direct the course of the air entering the cleaner 10 extend about the upper and side peripheries of the inlet ports 11 and are secured to the internal surface of the front wall 12. Each of the baffles 13 includes two vertical sidewalls 13a and 13b and a pitched rooflike covering 13c. The baffles 13 extend internally of the cleaner 10 from the inclined front wall 12 to a vertical wall 15 which forms the rear closure member for the cleaner. The baffles are joined to the front and rear walls 12 and 15 respectively by any suitable leak-proof securement such as welding or soldering to prevent leakage of cleaning solvent and to ensure properly directed airflow through the cleaner. The cleaner 10 also includes vertical sidewalls 16 and 17 which meet with the front and rear walls 12 and 15 respectively and a vertically disposed front access panel 18 which extends across the front of the cleaner 10 between the sidewalls 16 and 17. The access panel 18 is provided with a plurality of covered access openings 18a through which the internal components of the cleaner may be serviced. A second vertically disposed front wall 19 and adjoining bottom wall 20 extend between the sidewalls 16 and 17 to form a reservoir 21 at the bottom of the cleaner structure. The external cleaner structure is completed by a horizontally disposed wall 22 at the top of the cleaner 10. It will be understood that all seams between adjoining walls of the cleaner 10 are suitably sealed to prevent fluid and air leakage.

With the foregoing construction in mind and with reference to FIG. 2, it may be seen that grease-laden vapors entering the cleaner 10 are forced to flow through inlet ports 11 under the lower ends of the vertical baffle walls 13a and 13b and up through the exhaust pipe 12. As best described by reference to FIG. 3 which illustrates the air cleaner 10 with front walls 12, 18 and 19 removed, filter material 23 is disposed adjacent the baffles 13 such that the previously described airflow through the cleaner forces the grease-laden vapors to pass through the filter material 23 before being exhausted through the conduit 14. A detergent solution 24 contained in the reservoir 21 is continuously circulated over the filter material 23 by means of a submersible electrically driven pump 25 which forces the solution in the reservoir 21 up through a conduit 26 to a spray header 27. The solution is then sprayed on the filter material 23 through a plurality of nozzles 28 extending from the header 27 and flows through the filter material to wash away any grease and oil removed from the cooking vapors. The solution then drops back into the reservoir 21 where it is recirculated by the pump 25. It will be appreciated that the design of baffles 13 prevents the solvent 24 from escaping the cleaner 10 through the ports 11 as it flows downwardly toward the reservoir 21. Suitable screens 29 formed of stainless steel or other suitable noncorrosive material are secured adjacent the lower ends of the baffles 13 and serve to retain the filter material 23 in the illustrated position to prevent it from falling into the reservoir area of the cleaner 10.

The cleansing solution 24 may conveniently be prepared by the addition of a suitable detergent to water contained in the reservoir 21. For this purpose, a water supply line 30 extends into the reservoir 21 and is provided with a float control valve 31 which automatically maintains a predetermined liquid level in the reservoir. The detergent may be added to water contained in the reservoir 21 through any suitable opening in the cleaner 10 such as an opening 32 in the top wall 22 covered by a removable lid 33. When it is desired to replace the cleaning solvent, it may be drained from the reservoir 21 by means of a drain valve 32 which extends through the bottom wall 20 of the cleaner. The float valve 31 will then automatically refill the reservoir 21 to the desired level and detergent may then be added as previously described.

Operation of the electrical pump 25 may be regulated by appropriate controls disposed in a control box 33 secured to the sidewall 16. Such controls may include circuit breakers, timing mechanisms and temperature-sensitive regulating mechanisms for regulating pump operation.

FIG. 4 illustrates a preferred modification of the cleaner 10 which is designed to facilitate construction and servicing. In the embodiment of FIG. 4, the cleaner 10 is illustrated as including upper and lower sections 10a and 10b respectively with upper section 10a being adapted to seat within the lower section 10b. It will be apparent that the top section 10a may be lifted out of the bottom section 10b to provide access to the internal components of the cleaner 10.

The cleaner 10 is preferably constructed from noncorrosive, fireproof materials such as stainless steel or galvanized sheet metal. The filter material may be stainless wool or brass wool packing or any other suitable filtering material which is resistant to fire and corrosion.

The foregoing disclosure and description of the invention is illustrative and explanatory thereof, and various changes in the size, shape and materials as well as in the details of the illustrated construction may be made within the scope of the appended claims without departing from the spirit of the invention.

I claim:
1. An air cleaner comprising:
 a. an enclosed structure defined by sidewalls, top and bottom walls and front and backwalls;
 b. inlet port means formed in said front wall for admitting air into said enclosed structure;
 c. exhaust port means included in said structure for exhausting air from said structure;
 d. filter material means disposed internally of and transverse said structure between said inlet and outlet port means for removing impurities from air entering said inlet port means;
 e. reservoir means formed within said structure below said filter means for collecting and containing cleaning fluid circulated internally of said structure;
 f. circulating means included in said structure for conveying cleaning fluid from said reservoir means to said filter means for cleansing said filter material means of impurities removed from the air entering said inlet port means; and
 g. baffle means supporting said filter material means disposed adjacent said inlet port means internally of said structure for directing air entering said inlet port means through said filter material means and for directing the circulating flow of cleaning fluid from said filter material means away from said inlet port means into the reservoir means.

2. The air cleaner as defined in claim 1 wherein:
 a. said enclosed structure includes separable top and bottom sections; and
 b. said top section is slidably received in said bottom section.

3. The air cleaner as defined in claim 2 wherein:
 a. said reservoir means is carried in said lower section; and
 b. said baffle means is carried in said upper section.

4. The air cleaner as defined in claim 1 wherein said baffle means extend between said front and backwalls.

5. The air cleaner as defined in claim 4 wherein:
 a. said inlet port means include a plurality of inlet port openings formed in said front wall; and
 b. said baffle means extend partially about the outer periphery of said port openings and are secured to said front wall and said backwall by leak-proof seal means.

6. The air cleaner as defined in claim 5 wherein:
 a. said front wall includes an inlet port section disposed above a reservoir section;
 b. said inlet port section is inclined with respect to said backwall and said reservoir section is substantially parallel to said backwall;

c. said inlet port section slopes away from said rearwall with the upper portions of said inlet portion section being further from said rear wall than the lower portions of said inlet port section; and d. said inlet port openings are formed in said inlet port section.

7. The air cleaner as defined in claim 6 wherein:
a. said enclosed structure includes separable top and bottom sections; and
b. said top section is slidably received in said bottom section.

8. The air cleaner as defined in claim 7 wherein:
a. said reservoir means is carried in said lower section; and
b. said baffle means is carried in said upper section.

9. The air cleaner as defined in claim 6 wherein:
a. said baffle means includes a separate baffle associated with each of said inlet port openings::
b. each of said baffles includes baffle walls secured about the upper and side peripheries of its associated inlet port opening; and
c. said filter means includes filter material disposed internally of said structure substantially within the area defined between said baffle walls, said inlet port section, said backwall and said sidewalls.

10. The air cleaner as defined in claim 9 wherein:
a. said enclosed structure includes separable top and bottom sections; and
b. said top section is slidably received in said bottom section.

11. The air cleaner as defined in claim 9 wherein:
a. said reservoir means includes a reservoir tank defined substantially between said reservoir section, said sidewalls, said backwall and said bottom wall; and
b. said circulating means includes liquid spray means disposed above said filter material and pumping means connected with said spray means for pumping cleaning fluid from said reservoir tank to said spray means.

12. The air cleaner as defined in claim 11 wherein:
a. said enclosed structure includes separable top and bottom sections; and
b. said top section is slidably received in said bottom section.

13. The air cleaner as defined in claim 12 wherein:
a. said reservoir means is carried in said lower section; and
b. said baffle means is carried in said upper section.

14. The air cleaner as defined in claim 11 wherein said reservoir means further includes:
a. liquid supply means extending into said reservoir tank;
b. valve means connected to said liquid supply means; and
c. automatic control means connected with said valve means for automatically opening or closing said valve means when the liquid level within said reservoir tank falls below or raises above a predetermined level.

15. The air cleaner as defined in claim 14 wherein:
a. said enclosed structure includes separable top and bottom sections; and
b. said top section is slidably received in said bottom section.

16. The air cleaner as defined in claim 15 wherein:
a. said reservoir means is carried in said lower section; and
b. said baffle means is carried in said upper section.

17. The air cleaner as defined in claim 14 wherein:
a. said pumping means includes a submersible, electrically driven pump;
b. said spray means includes a fluid conductor having a plurality of spray nozzles; and
c. said automatic control means includes a float.

18. The air cleaner as defined in claim 17 wherein:
a. said enclosed structure includes separable top and bottom sections; and
b. said top section is slidably received in said bottom section.

19. The air cleaner as defined in claim 18 wherein:
a. said reservoir means is carried in said lower section; and
b. said baffle means is carried in said upper section.